J. R. BENTLEY.
CULINARY ARTICLE.
APPLICATION FILED MAR. 9, 1912.
1,065,997.
Patented July 1, 1913.
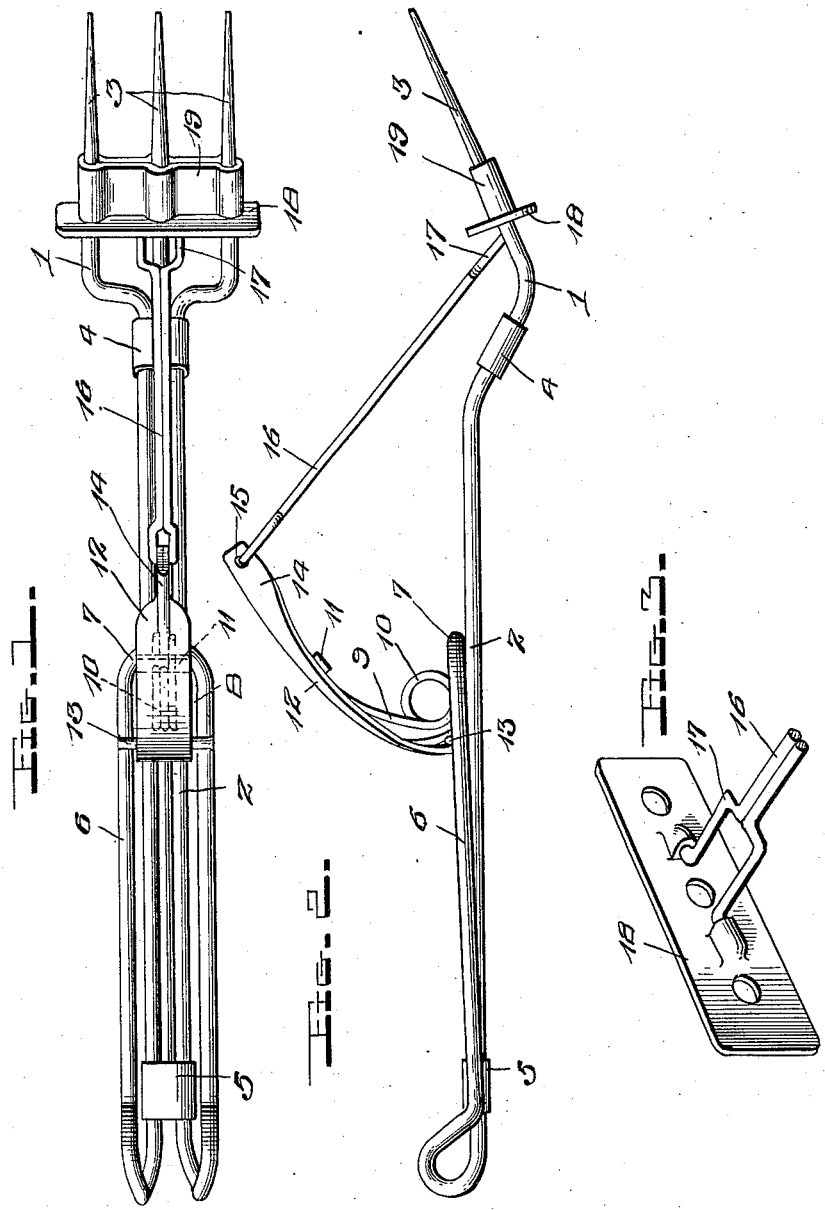
Witnesses
Chas. L. Grieshauer
A. B. Norton
Inventor
J. R. Bentley,
By Watson E. Coleman
Attorney

UNITED STATES PATENT OFFICE.

JOHN REED BENTLEY, OF NASHUA, IOWA.

CULINARY ARTICLE.

1,065,997.     Specification of Letters Patent.     Patented July 1, 1913.

Application filed March 9, 1912. Serial No. 682,688.

*To all whom it may concern:*

Be it known that I, JOHN REED BENTLEY, a citizen of the United States, residing at Nashua, in the county of Chickasaw and State of Iowa, have invented certain new and useful Improvements in Culinary Articles, of which the following is a specification, reference being had to the accompanying drawings.

This invention comprehends certain new and useful improvements in kitchen utensils or culinary articles, and relates particularly to an improved attachment for forks, spoons, ladles or the like, whereby they may be easily stripped of the meat or other food engaged thereby.

The invention has for its primary object a simple, durable and efficient construction of spring retracted attachment for forks or similar culinary articles, the parts of which may be cheaply manufactured and readily assembled and which may be operated by the thumb or finger of the same hand that grasps the handle of the fork or the like to actuate the stripping device, the same being automatically returned to its initial position after the manual actuation. And the invention also aims to generally improve this class of devices and to render them more useful and commercially desirable.

With these and other objects in view as will more fully appear as the description proceeds the invention consists in certain constructions, combinations and arrangements of parts that I shall hereinafter fully describe and claim.

For a full understanding of the invention reference is to be had to the following description and accompanying drawings, in which—

Figure 1 is a top plan view of my improved culinary article. Fig. 2 is a side view thereof, and Fig. 3 is a detail perspective view of a part of the stripping device.

Corresponding and like parts are referred to in the following description and designated in the accompanying drawings by like reference characters.

In the accompanying drawings my invention is shown as applied to a fork, although it is to be understood that this is done for the purpose of illustration only and that the invention is not limited to this use. The fork 1 is in the present instance composed of three longitudinally extending wires 2 lying close one alongside of the other to form the shank of the fork and separated near one end and extended forwardly parallel to each other to form the tines 3. A collar 4 encircles the wires 2 at one end of the shank, so as to assist in holding the parts together, although it is to be understood that solder or the like is used to secure the parts in proper position relative to each other. At the opposite end of the shank a corresponding collar 5 is provided. Two of the wires, namely, the outside wires are preferably continued past the collar 5 and are bowed and returned upon themselves to form a handle 6, said wires being preferably integrally connected together by a curved cross bar 7 which lies upon the three wires 2 at the main portion thereof intermediate the ends of the shank which provides a space 8 between the cross bar and the intermediate wire which constitutes a socket for one end of a retracting spring 9. The spring 9 is coiled one or more times as indicated at 10 and has its other end extended underneath the cross bar 11 which is secured to a thumb piece 12 which is hingedly connected at one end to a transversely extending pin 13 secured to the opposite wires of the handle 6. The relatively free end of the thumb piece 12 is laterally reduced as at 14 and is formed with an aperture 15 in which is pivotally connected a link 16, said link consisting of two wires that are turned outwardly at their forward extremities and pivotally connected as at 17 to a stripper plate 18. The plate 18 is formed with three apertures by which it is mounted for movement on the tines 3 and is preferably provided with a band 19 crimped around the tines and secured to the plate 18 so as to coact therewith in stripping the tines.

From the foregoing description in connection with the accompanying drawings, the operation of my improved fork or similar culinary article will be apparent.

In the practical use of the device after the tines of the fork have been engaged in the meat, for instance, and it is desired to strip the tines thereof, it is only necessary for the operator to press his or her thumb upon the thumb piece, whereupon the stripping piece will be moved outwardly and the tines stripped of the food. By merely releasing the thumb piece, the spring will return the parts to their initial or normal position.

While the accompanying drawings illustrate what I believe to be the preferred form of my invention, it is to be understood that the invention is not limited thereto but that various changes may be made in the constructions, arrangements and proportions of the parts without departing from the scope of the invention as defined in the appended claim.

Having thus described my invention, I claim:

The combination with a fork of the character described, of a shank provided with a handle, the handle being formed with a cross bar extending across the shank proper and formed with a socket, a transversely extending pin carried by the handle adjacent the cross bar thereof, a thumb piece pivotally mounted at one end on said pin, said spring having its ends detachably connected to the thumb piece and within said socket, a removable stripper arranged upon the tines of the fork, said stripper being provided with opposed sockets on its inner face, a link comprising a single length of spring wire bent upon itself and formed at one end with an eye for pivotal engagement with the opposite end of said thumb piece, the opposite ends of said wire being bent outwardly and forwardly, and the extremities of said wire being offset in opposite directions and adapted for pivotal engagement with the opposed sockets in the stripper, substantially as and for the purpose set forth.

In testimony whereof I hereunto affix my signature in the presence of two witnesses.

JOHN REED BENTLEY.

Witnesses:
 ARTHUR F. STUELKE,
 SADIE B. WAITE.

Copies of this patent may be obtained for five cents each, by addressing the "Commissioner of Patents, Washington, D. C."